(12) United States Patent
Nagatsu et al.

(10) Patent No.: US 9,719,441 B2
(45) Date of Patent: Aug. 1, 2017

(54) CONTROL DEVICE FOR COMPRESSION IGNITION-TYPE ENGINE

(71) Applicant: MAZDA MOTOR CORPORATION, Hiroshima (JP)

(72) Inventors: Kazuhiro Nagatsu, Hiroshima (JP); Atsushi Inoue, Hiroshima (JP); Kota Matsumoto, Hiroshima (JP); Takashi Kaminaga, Hiroshima (JP); Toru Miyamoto, Higashihiroshima (JP); Takashi Youso, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/032,899

(22) PCT Filed: Oct. 23, 2014

(86) PCT No.: PCT/JP2014/005381
§ 371 (c)(1),
(2) Date: Apr. 28, 2016

(87) PCT Pub. No.: WO2015/064066
PCT Pub. Date: May 7, 2015

(65) Prior Publication Data
US 2016/0252031 A1 Sep. 1, 2016

(30) Foreign Application Priority Data

Oct. 29, 2013 (JP) .................................. 2013-224534

(51) Int. Cl.
*F02D 41/04* (2006.01)
*F02D 21/08* (2006.01)
(Continued)

(52) U.S. Cl.
CPC ............ *F02D 41/04* (2013.01); *F01N 3/0842* (2013.01); *F02B 3/08* (2013.01); *F02D 21/06* (2013.01);
(Continued)

(58) Field of Classification Search
CPC ........ F02D 41/04; F02D 41/083; F02D 21/00; F02D 21/02; F02D 21/04; F02D 21/06;
(Continued)

(56) References Cited

U.S. PATENT DOCUMENTS 6,152,118 A * 11/2000 Sasaki ................... F02D 21/08
123/568.21
2005/0016496 A1 1/2005 Hitomi et al.
(Continued)

FOREIGN PATENT DOCUMENTS

JP 2005-016407 A 1/2005
JP 2007-154859 A 6/2007
(Continued)

OTHER PUBLICATIONS

International Search Report and Written Opinion issued in Application No. PCT/JP2014/005381, mailed Feb. 3, 2015.

*Primary Examiner* — Jacob Amick
(74) *Attorney, Agent, or Firm* — Studebaker & Brackett PC

(57) ABSTRACT

A control device for a compression ignition engine includes a controller configured to operate an engine body by compression ignition combustion when the engine body operates in a predetermined compression ignition range. When the engine body operates in a predetermined high load range of the compression ignition range, the controller maximizes a filling amount of the cylinder using a gas state adjustment system, and lowers an EGR ratio so that the air-fuel mixture in the cylinder is lean with an excess air ratio λ higher than (Continued)

1 in a lower speed range, and maximizes the filling amount of the cylinder, and increases the EGR ratio so that the air-fuel mixture in the cylinder has the excess air ratio λ of 1 or lower in a higher speed range than the lower speed range.

6 Claims, 7 Drawing Sheets

(51) Int. Cl.
    *F02D 41/00*     (2006.01)
    *F02D 41/30*     (2006.01)
    *F02D 41/40*     (2006.01)
    *F02M 25/12*     (2006.01)
    *F02D 41/02*     (2006.01)
    *F02D 21/06*     (2006.01)
    *F01N 3/08*     (2006.01)
    *F02B 3/08*     (2006.01)
    *F02D 21/10*     (2006.01)
    *F02D 13/02*     (2006.01)
    *F02B 17/00*     (2006.01)

(52) U.S. Cl.
    CPC ............. *F02D 21/08* (2013.01); *F02D 21/10* (2013.01); *F02D 41/006* (2013.01); *F02D 41/0025* (2013.01); *F02D 41/0057* (2013.01); *F02D 41/02* (2013.01); *F02D 41/3023* (2013.01); *F02D 41/3035* (2013.01); *F02D 41/401* (2013.01); *F02M 25/12* (2013.01); *F01N 2570/14* (2013.01); *F02B 17/005* (2013.01); *F02D 13/02* (2013.01); *F02D 41/0065* (2013.01); *F02D 2041/001* (2013.01); *F02D 2041/3052* (2013.01); *Y02T 10/128* (2013.01); *Y02T 10/44* (2013.01); *Y02T 10/47* (2013.01)

(58) Field of Classification Search
    CPC ............... F02D 21/08; F02D 2021/083; F02D 2021/086; F02D 21/10; F02D 41/0047; F02D 41/005; F02D 41/0052; F02D 41/0057; F02D 41/0062; F02B 17/005; F02B 3/08
    See application file for complete search history.

(56) References Cited

U.S. PATENT DOCUMENTS

| | | |
|---|---|---|
| 2012/0216776 A1 | 8/2012 | Nagatsu et al. |
| 2013/0019841 A1 | 1/2013 | Ando et al. |
| 2015/0240706 A1* | 8/2015 | Yamagata ............... F02D 21/08 60/603 |

FOREIGN PATENT DOCUMENTS

| | | |
|---|---|---|
| JP | 2009-091994 A | 4/2009 |
| JP | 2010-285969 A | 12/2010 |
| JP | 2012-127275 A | 7/2012 |
| JP | 2012-172663 A | 9/2012 |
| JP | 2012-172665 A | 9/2012 |
| JP | 2012-246783 A | 12/2012 |
| JP | 2012-246784 A | 12/2012 |
| WO | 2011/118767 A1 | 9/2011 |

* cited by examiner

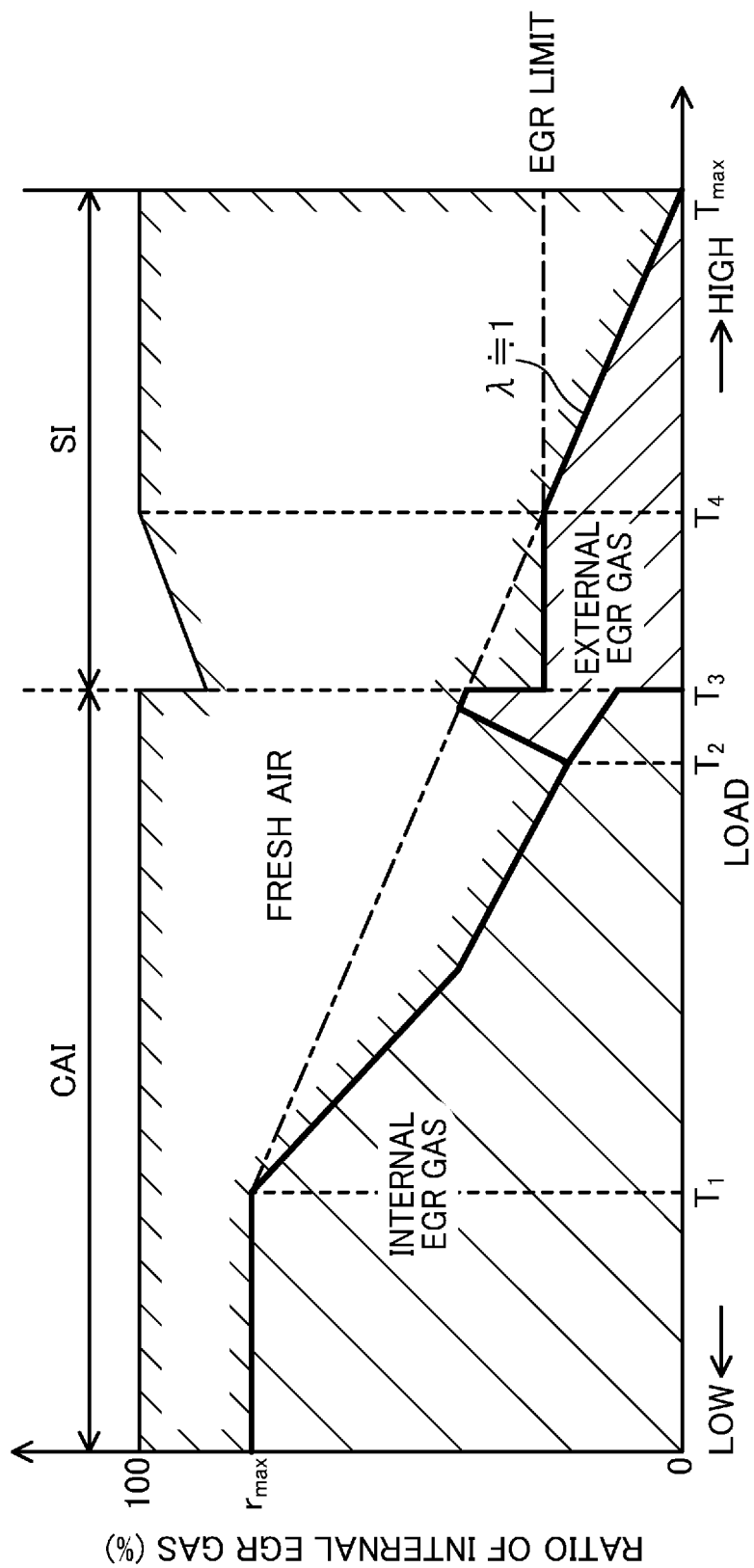

CONTROL DEVICE FOR COMPRESSION IGNITION-TYPE ENGINE

TECHNICAL FIELD

The present invention relates to control devices for compression ignition engines.

BACKGROUND ART

For example, Patent Document 1 shows an engine performing compression ignition combustion of an air-fuel mixture in a cylinder, when the engine operates in a predetermined low-speed partial-load operation range.

Patent Document 2 shows an engine performing compression ignition combustion when the engine operates in a predetermined or lower switching load range, while performing combustion by forcibly igniting using a spark plug an air-fuel mixture in a cylinder, when the operation range of the engine falls with a load operation range higher than the switching load range. In performing compression ignition combustion, this engine performs what is called "two-time opening" of the exhaust valve of opening an exhaust valve again in an intake stroke to introduce into the cylinder, part of exhaust gas that has been discharged to an exhaust side. The introduction of internal EGR gas by two-time opening of the exhaust valve increases the compression end temperature in the cylinder 18, and is advantageous in improving the ignitionability in the compression ignition and the combustion stability.

Patent Document 3 shows an engine switchable between compression ignition combustion and spark ignition combustion in accordance with the operation of the engine. Patent Document 3 also teaches introducing part of the exhaust gas into the cylinder via the EGR passage in transition from the compression ignition combustion to the spark ignition combustion, and enriching the air-fuel ratio of the mixture to reduce knocking.

CITATION LIST

Patent Document

[PATENT DOCUMENT 1] Japanese Unexamined Patent Publication No. 2007-154859
[PATENT DOCUMENT 2] Japanese Unexamined Patent Publication No. 2012-172665
[Patent Document 3] Japanese Unexamined Patent Publication No. 2009-91994

SUMMARY OF THE INVENTION

Technical Problem

In the engine shown in Patent Document 2, in order to reduce pump losses, the maximum amount of gas fills the cylinder and the ratio of the amount of fresh air introduced into the cylinder to the amount of exhaust gas varies in accordance with the engine load in the range performing compression ignition combustion. Specifically, with an increase in the engine load, the state of temperature in the cylinder also increases. Thus, the amount of internal EGR gas introduced into the cylinder is reduced and the amount of fresh air is increased. This is advantageous in reducing an excessive increase in the state of temperature in the cylinder, and a rapid pressure rise in in the cylinder in accordance with compression ignition combustion (i.e., dP/dt). The excess air ratio $\lambda$ of the air-fuel mixture in the cylinder is substantially 1 regardless of the level of the engine load. This enables excellent exhaust emission utilizing a three-way catalyst.

In a higher load operation range, in which the state of temperature in the cylinder increases in the range performing compression ignition combustion, the amount of heat generated per unit time is relatively low in a lower speed range, and the state of temperature in the cylinder is also relatively lower than in a higher speed range. Therefore, a combustion type to be employed in the lower speed range is different from that in the higher speed range in view of improving fuel efficiency.

The technique disclosed herein was made in view of these respects. It is an object of the present disclosure to provide a compression ignition engine performing compression ignition combustion in a predetermined range, and to improve fuel efficiency in a lower speed range of a high load range of the range performing compression ignition combustion.

Solution to the Problem

The technique disclosed herein relates to a control device for a compression ignition engine. The control device includes an engine body including a cylinder; a fuel injection valve configured to inject fuel into the cylinder; a gas state adjustment system configured to adjust a ratio of an amount of fresh air introduced into the cylinder to an amount of exhaust gas to adjust a gas state of the cylinder; and a controller configured to operate the engine body by compression ignition combustion of an air-fuel mixture in the cylinder when the engine body operates in a predetermined compression ignition range.

When the engine body operates in a predetermined high load range of the compression ignition range, the controller maximizes a filling amount of the cylinder using a gas state adjustment system, and lowers an EGR ratio, which is a ratio of an amount of the exhaust gas to an entire amount of gas in the cylinder so that the air-fuel mixture in the cylinder is lean with an excess air ratio $\lambda$ higher than 1 in a lower speed range, and maximizes the filling amount of the cylinder, and increases the EGR ratio so that the air-fuel mixture in the cylinder has the excess air ratio $\lambda$ of 1 or lower in a higher speed range than the lower speed range.

The "gas state adjustment system" adjusts the amount of gas introduced into the cylinder (i.e., the filling amount), and the ratio of the amount of fresh air introduced into the cylinder to the amount of exhaust gas. The amount of fresh air introduced into the cylinder is adjustable by the opening degree of a throttle valve, a closing time of an intake valve, and/or the amount of exhaust gas introduced into the cylinder, for example. The amount of exhaust gas introduced into the cylinder may be adjusted through an internal EGR system and/or an external EGR system. The internal EGR system retains and/or introduces part of the exhaust gas in the cylinder by controlling the opening times of the intake and exhaust valves of the engine body. The external EGR system introduces part of the exhaust gas into the cylinder via an EGR passage that communicates with exhaust and intake passages of the engine body. In particular, when the engine body operates in the compression ignition range, internal EGR gas is preferably introduced by the internal EGR system into the cylinder. Since the internal EGR gas has a relatively high temperature, this increases a compression end temperature and is advantageous in improving the ignitionability in the compression ignition and the combustion stability.

As described above, in the "lower speed range," a small amount of heat is generated per unit time, thereby lowering the state of temperature in the cylinder. The low state of temperature reduces rapid pressure rise in the cylinder according to the compression ignition combustion. The lower speed range may be set as appropriate at the speed lower than ½ of the speed range of the engine body, for example.

In the configuration described above, the control device operates the engine body by the compression ignition combustion of the air-fuel mixture in the cylinder when the engine body operates in the predetermined compression ignition range. When the engine body operates in the predetermined high load range of the compression ignition range, the controller changes the state of gas in the cylinder in the lower speed range and the higher speed range than the lower speed range using the gas state adjustment system.

Specifically, in the lower speed range, the controller maximizes the filling amount of the cylinder, and lowers the EGR ratio so that the air-fuel mixture is lean with an excess air ratio λ higher than 1. That is, the amount of exhaust gas introduced into the cylinders is reduced, and the amount of fresh air is increased. When the engine body operates at a low speed, a smaller amount of heat is generated per unit time, and thus the state of temperature in the cylinder becomes relatively low. This prevents the compression end temperature from increasing excessively, resulting in reduction in a rapid pressure rise (dP/dt) in the cylinder, and generation of RawNOx.

Thus, when the engine body operates in the lower speed range, the controller makes the air-fuel mixture lean with an excess air ratio λ higher than 1 to improve thermal efficiency, thereby also improving the fuel efficiency. In a structure with a NOx purification catalyst, for example, the excess air ratio λ may be any value higher than 1. On the other hand, in a structure without any NOx purification catalyst, for example, the excess air ratio λ is preferably, for example, 2.4 or higher. Setting the excess air ratio λ to be higher than or equal to 2.4 reduces generation of RawNOx, thereby reducing discharge of NOx even in the structure without any NOx purification catalyst. In particular, in the structure without any NOx purification catalyst, in the lower speed range with the excess air ratio λ higher than or equal to 2.4, the load is preferably lower than or equal to a predetermined load. This is because an increase in the load of the engine body increases the amount of injected fuel, and setting the excess air ratio λ to be 2.4 or higher becomes difficult.

In the structure describe above, the "predetermined high load range of the compression ignition range" excludes a too low load range (e.g., a light load range). Specifically, when the engine body operates in a light load range, the amount of unburnt fuel tends to increase. Thus, the fuel efficiency is more effectively improved by increasing the amount of exhaust gas introduced into the cylinder to reduce unburnt fuel loss, than by making the air-fuel mixture lean with the excess air ratio λ later than 1 to improve thermal efficiency. For this reason, the "lower speed range" is preferably limited to the load range of the engine body, in which the fuel efficiency is relatively effectively improved by making the air-fuel mixture lean. In a lower load range, that is, in the load range of engine body, in which the fuel efficiency is relatively effectively improved by reducing unburnt fuel loss, the excess air ratio λ of the air-fuel mixture is preferably 1 or lower and the EGR ratio is preferably relatively high.

In a higher speed range than the lower speed range, the filling amount of the cylinder is maximized, and the EGR ratio is increased so that the air-fuel mixture in the cylinder has an excess air ratio λ of 1 or lower. An increase in the amount of exhaust gas introduced into the cylinder lowers the combustion temperature, and is advantageous in reducing generation of RawNOx. The excess air ratio λ of substantially 1 (i.e., λ is about 1) of the air-fuel mixture in the cylinder allows for maintaining excellent exhaust emission with a three-way catalyst. The state of temperature in the cylinder is higher in the higher speed range than in the lower speed range. However, the higher speed range has a relative large amount of exhaust gas. Slow compression ignition combustion is advantageous in reducing combustion noise.

The fuel injection valve is preferably configured to directly inject the fuel into the cylinder. The controller preferably sets a time of fuel injection with the fuel injection valve in a first half of a compression stroke or earlier in the lower speed range of the predetermined rang, and sets the time of fuel injection with the fuel injection valve in a second half of the compression stroke or later in the higher speed range of the predetermined range.

Specifically, when the engine body operates in a higher load range, the state of temperature in the cylinder is high. Thus, rapid pressure rise (dP/dt) in the cylinder according to the compression ignition combustion could not be reduced simply by controlling the state of temperature in the cylinder including adjusting the amount of internal EGR gas.

In this respect, the time of fuel injection into the cylinder using the fuel injection valve is in the second half of the compression stroke or later. This enables the compression ignition combustion in the expansion stroke in which motoring gradually reduces the pressure in the cylinder. The "second half of the compression stroke" is the second half where the compression stroke is divided into the first half and the second half in accordance with the progress at a crank angle. The period "second half of the compression stroke or later" includes the second half of the compression stroke and the expansion stroke. Fuel injection at a relatively late time may be hereinafter referred to as "retard injection." Employing this technical idea of the retard injection in the higher speed range of the predetermined range reduces rapid pressure rise in the cylinder according to the compression ignition combustion in the higher speed range of the predetermined range, in which the state of temperature in the cylinder is relatively high as compared to the lower speed range.

The retard injection reduces the period of forming the air-fuel mixture, which may thus become locally rich. Thus, in view of securing exhaust emission, it is preferable to set the excess air ratio λ of the air-fuel mixture to be substantially 1 to enables utilization of a three-way catalyst.

On the other hand, in the lower speed range, the state of temperature in the cylinder is low as described above, and there is no need to employ the retard injection described above. Thus, in the lower speed range of the predetermined range, the time of fuel injection with the fuel injection valve is in the first half of the compression stroke or earlier. The "first half of the compression stroke" is the first half where the compression stroke is divided in the first half and the second half in the progress at the crank angle. The period "in the first half of the compression stroke or earlier" includes the first half of the compression stroke and the intake stroke. Non-employment of retard injection allows the excess air ratio λ of the air-fuel mixture to be higher than 1. A relatively early time of fuel injection allows for forming a homogeneous lean air-fuel mixture.

The control device for a compression ignition engine may further include an ozonator configured to add ozone to the fresh air introduced into the cylinder. The controller may add the ozone to the fresh air introduced into the cylinder using the ozonator in the lower speed range of the predetermined range. The "ozonator" may be provided in the intake passage, and may add the ozone to the fresh air introduced into the cylinder.

As described above, this structure makes the air-fuel mixture lean in the lower speed range of the predetermined range, and thus a relatively large amount of fresh air is introduced into the cylinder. In this range, addition of the ozone to the fresh air introduced into the cylinder enables introduction of a large amount of ozone into the cylinder. This is advantageous in improving the ignitionability in the compression ignition and the stability in the compression ignition combustion.

The controller may allow the ozonator to add the ozone to the fresh air introduced into the cylinder in the lower speed range of the predetermined range when an outside air temperature is lower than or equal to a predetermined temperature.

When the outside air temperature is lower than or equal to a predetermined temperature, the temperature of fresh air introduced into the cylinder decreases to reduce the compression start temperature in the cylinder. This lowers the compression end temperature, thereby reducing the ignitionability in the compression ignition and the stability in the compression ignition combustion. In particular, in the lower speed range of the predetermined range described above, a relatively large amount of fresh air is introduced into the cylinder to cause significant drop in the compression start temperature and the compression end temperature drop due to a low outside air temperature.

At this time, addition of the ozone to the fresh air introduced into the cylinder allows for introducing a relatively large amount of ozone into the cylinder as described above. Thus, even at a low compression end temperature, the ignitionability in the compression ignition and the stability in the compression ignition combustion improve at the same time.

Advantages of the Invention

As described above, when the engine body operates in a predetermined high load range and a lower speed range of the compression ignition range, the control device for a compression ignition engine maximizes the filling amount of the cylinder, and lowers the EGR ratio so that the air-fuel mixture is lean with an excess air ratio λ higher than 1. This reduces rapid temperature rise (dP/dt) in the cylinder according to the compression ignition combustion, and is advantageous in improving the fuel efficiency due to an improvement in thermal efficiency. On the other hand, when the engine body operates in a predetermined high load range and higher speed range of the compression ignition combustion range, the controller maximizes the filling amount of the cylinder and increases the EGR ratio so that the excess air ratio λ of the air-fuel mixture is lower than or equal to 1. This reduces generation of NOx to ensure exhaust emission and is advantageous in reducing combustion noise.

BRIEF DESCRIPTION OF THE DRAWINGS

FIG. 8 illustrates an example relationship between the level of an engine load and an EGR ratio.

DESCRIPTION OF EMBODIMENTS

Figure 1:
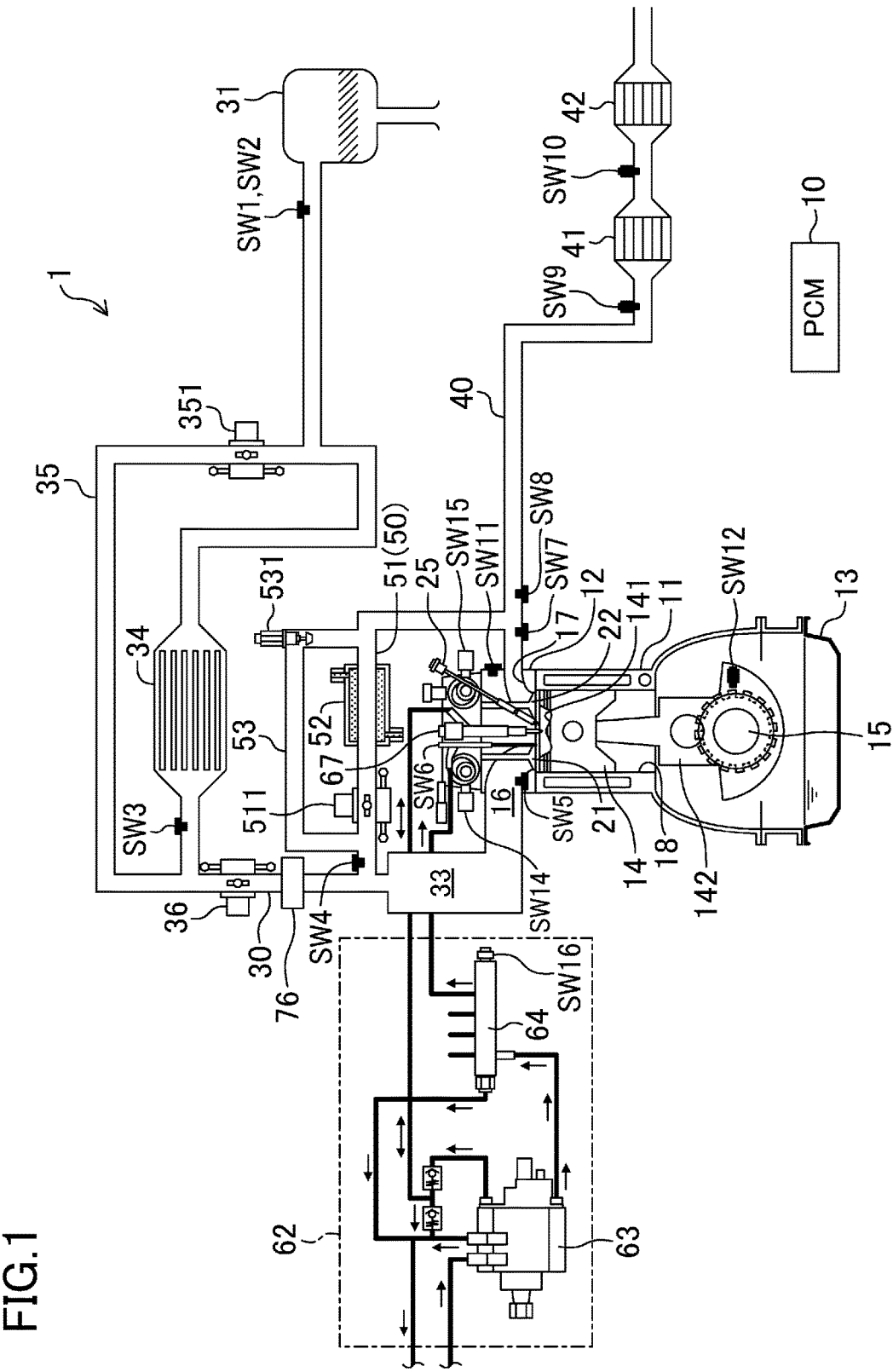
FIG. 1 is a schematic view illustrating the structure of a compression ignition engine.
Figure 2:
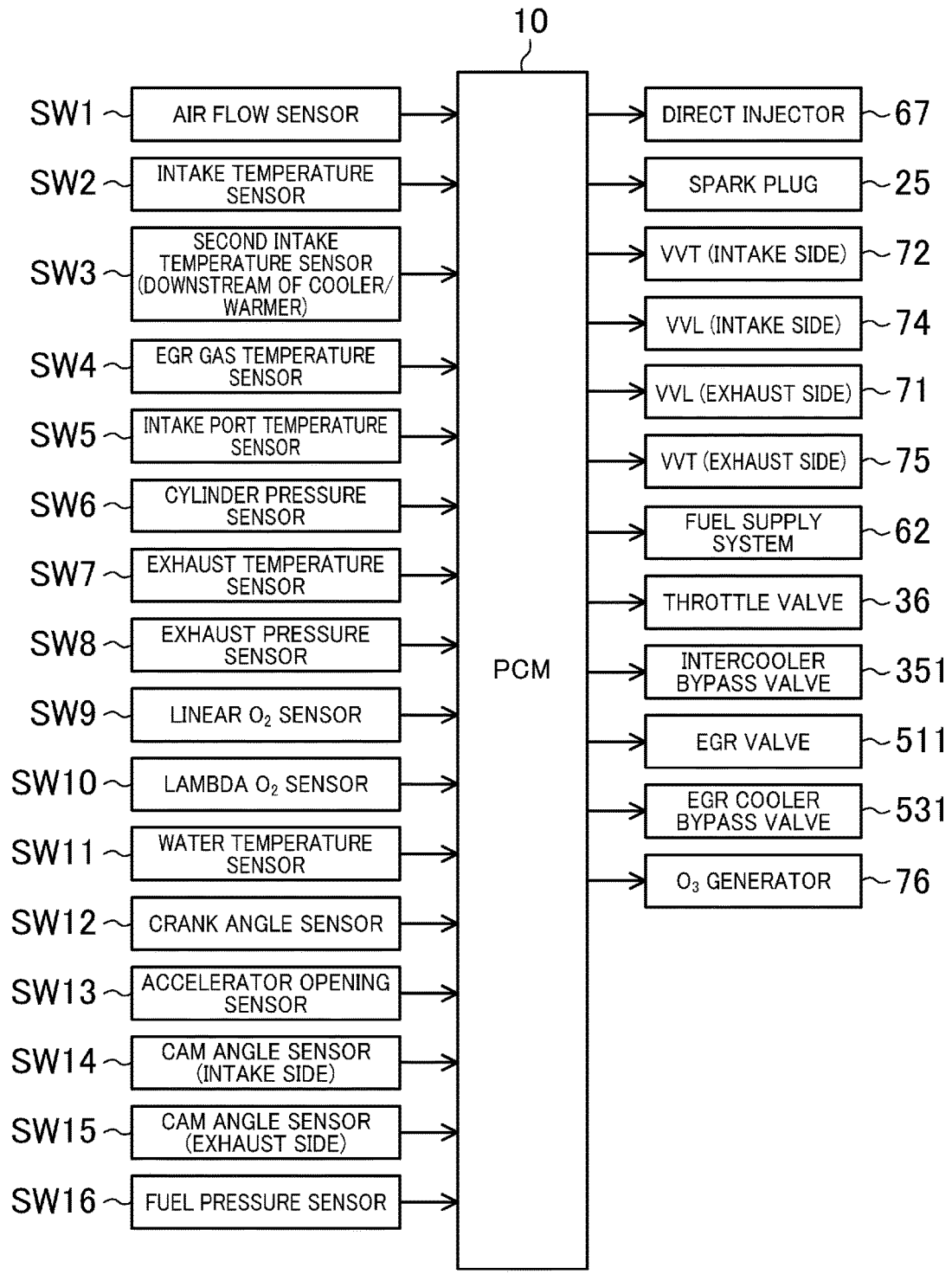
FIG. 2 is a block diagram illustrating the control of the compression ignition engine.
Figure 3:
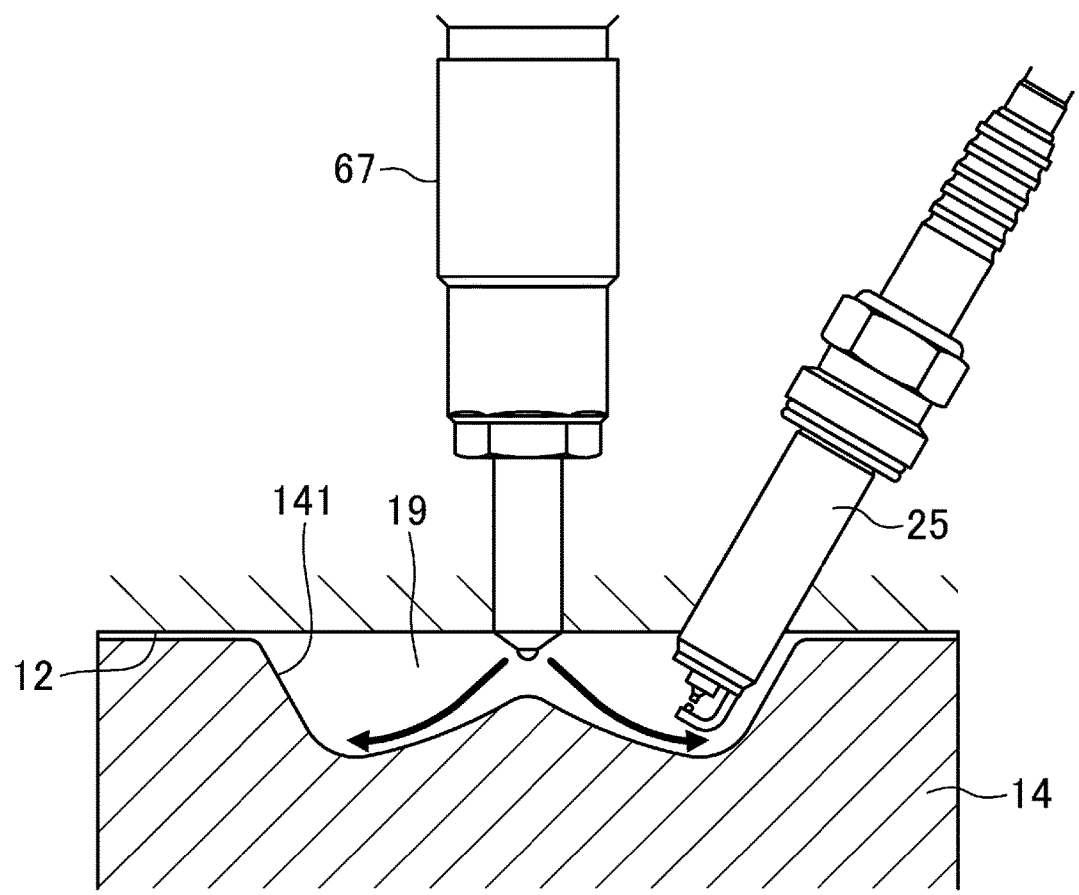
FIG. 3 is an enlarged cross-sectional view of a combustion chamber.

Embodiments of a control device for a compression ignition engine will now be described with reference to the drawings. The following preferred embodiments are mere examples. FIGS. 1 and 2 illustrate the schematic structure of an engine (i.e., an engine body) 1. The engine 1 is a spark ignition gasoline engine mounted in a vehicle and supplied with fuel containing at least gasoline. The engine 1 includes a cylinder block 11 provided with a plurality of cylinders 18 (although FIG. 1 shows only one cylinder, for example, four cylinders are arranged in a straight row), a cylinder head 12 disposed on the cylinder block 11, and an oil pan 13 disposed under the cylinder block 11 and storing lubricant. A piston 14 is fitted in each of the cylinders 18 to reciprocate. The piston 14 is connected to a crankshaft 15 via a con rod 142. A cavity 141 like a re-entrant cavity of a diesel engine is formed at the top of the piston 14, as shown in FIG. 3 enlarged. The cavity 141 faces an injector 67, which will be described later, when the piston 14 is near the compression top dead center. The cylinder head 12, the cylinder 18, and the piston 14 having the cavity 141 define a combustion chamber 19. The combustion chamber 19 is not limited to the form shown in the figure. The form of the cavity 141, the form of the top of the piston 14, the form of the ceiling of the combustion chamber 19, and other forms may be changed as appropriate.

This engine 1 has a relatively high geometrical compression ratio of 15 or higher to improve theoretical thermal efficiency, stabilize compression ignition combustion, which will be described later, for example. The geometrical compression ratio may be set as appropriate within the range from about 15 to about 20, both inclusive.

The cylinder head 12 has an intake port 16 and an exhaust port 17 for each cylinder 18. The intake port 16 and the exhaust port 17 are provided with an intake valve 21 and an exhaust valve 22, respectively, which open and close the openings at the combustion chamber 19.

Out of valve systems driving the intake valve 21 and the exhaust valve 22, an exhaust valve system has, for example, a hydraulic operation variable mechanism (see FIG. 2, hereinafter referred to as a variable valve lift (VVL) mechanism) 71, and a phase variable mechanism (hereinafter referred to as a variable valve timing (VVT) mechanism) 75. The VVL 71 switches the operating mode of the exhaust valve 22 between a normal mode and a special mode. The VVT 75 is capable of changing the rotation phase of an exhaust camshaft relative to the crankshaft 15. Although its structure is not shown in detail, the VVL 71 includes two types of cams with different cam profiles, a first cam with a single cam lobe, and a second cam with two cam lobes, and a lost motion mechanism selectively transmitting the operating mode of one of the first and second cams to the exhaust valve. When the operating mode of the first cam is transmitted to the exhaust valve 22, as represented by the solid line of FIG. 5, the exhaust valve 22 operates in the normal mode to be opened only once in an exhaust stroke. On the other hand, when the operating mode of the second cam is transmitted to the exhaust valve 22, as represented by the broken line of FIG. 5, the exhaust valve 22 operates in the special mode to be opened twice in the exhaust stroke and in an intake stroke. The VVL 71 is switched between the normal mode and the special mode in accordance with the operating mode of the engine. Specifically, the special mode is utilized in controlling internal EGR. In the following description, the normal mode operation of the VVL 71, which does not open the exhaust valve 22 twice, may be referred to as "turn off the VVL 71," and the special mode operation of the VVL 71, which opens the exhaust valve 22 twice, may be referred to as "turn on the VVL 71." An electromagnetic drive valve system driving the exhaust valve 22 with an electromagnetic actuator may be employed for the switch between the normal mode and the special mode.

The internal EGR may be executed not only by the two-time opening of the exhaust valve 22. The internal EGR may be controlled by, for example, opening the intake valve 21 twice, that is, two-time opening of the intake valve. Alternatively, a negative overlap period of closing both of the intake valve 21 and the exhaust valve 22 may be provided in the exhaust stroke or the intake stroke to retain burnt gas in the cylinder 18 to execute the internal EGR. As described above, however, two-time opening of the exhaust valve is most preferable to improve the compression end temperature.

The VVT 75 may have a known hydraulic, electromagnetic, or mechanical structure as appropriate, and the detailed structure is not shown in the figure. The opening and closing times of the exhaust valve 22 are continuously changeable by the VVT 75 within a predetermined range.

Like the exhaust valve system including the VVL 71 and VVT 75, the intake valve system has, for example, a VVL 74 and a VVT 72 as shown in FIG. 2. The intake VVL 74 differs from the exhaust VVL 71. The intake VVL 74 includes two types of cams having different cam profiles, a large lift cam relatively increasing the lift amount of the intake valve 21, and a small lift cam relatively decreasing the lift amount of the intake valve 21. The intake VVL 74 also includes a lost motion mechanism selectively transmitting the operating state of one of the large lift cam or the small lift cam to the intake valve 21. When the VVL 74 transmits the operating state of the large lift cam to the intake valve 21, the intake valve 21 is open with a relatively large lift amount as indicated by the solid line in FIG. 5, for a long time. On the other hand, when the VVL 74 transmits the operating state of the small lift cam to the intake valve 21, the intake valve 21 is open with a relatively small lift amount as indicated by the broken line in FIG. 5, for a short time. The large and small lift cams alternate without changing the opening/closing time.

Similar to the exhaust valve-side VVT 75, the intake valve-side VVT 72 may have a known hydraulic, electromagnetic, or mechanical structure as appropriate, and the detailed structure is not shown in the figure. The opening and closing timing of the intake valve 21 is continuously changeable by the VVT 72 within a predetermined range.

The cylinder head 12 is provided with the (direct) injector 67, which directly injects the fuel into each of the cylinders 18. As shown in FIG. 3 enlarged, the injector 67 is with its nozzle extending from the center of the ceiling of the combustion chamber 19 toward the inside of the combustion chamber 19. The injector 67 directly injects, into the combustion chamber 19, the fuel of the amount corresponding to the operating mode of the engine 1 at the injection timing corresponding to the operating mode of the engine 1. In this example, although not shown in detail, the injector 67 is a multi-hole injector with a plurality of nozzles. This structure allows the injector 67 to inject the fuel to radially spread fuel spray from the center of the combustion chamber 19. As indicated by the arrows of FIG. 3, the fuel spray, which is injected to radially spread from the center of the combustion chamber 19 when the piston 14 is near the compression top dead center, flows along the wall of the cavity 141 formed in the top of the piston. In other words, the cavity 141 is formed to house the fuel spray, which is injected when the piston 14 is near the compression top dead center. This combination of the multi-hole injector 67 and the cavity 141 is advantageous in shortening the mixture formation period after the fuel injection, and shortening a combustion period. The injector 67 is not limited to the multi-hole injector, but may have an outward opening valve.

A fuel tank (not shown) is connected to the injector 67 by a fuel supply passage. The fuel supply passage is provided with a fuel supply system 62 including a fuel pump 63 and a common rail 64, and capable of supplying the fuel to the injector 67 at a relatively high fuel pressure. The fuel pump 63 pumps the fuel from the fuel tank to the common rail 64. The common rail 64 stores the pumped fuel at a relatively high fuel pressure. The valve of the injector 67 is open, thereby injecting the fuel stored in the common rail 64 from the nozzle of the injector 67. Although not shown, the fuel pump 63 is a plunger pump, which is driven by the engine 1. The fuel supply system 62 including the pump, which is driven by the engine, supplies fuel of a high pressure of 30 MPa or higher to the injector 67. The fuel pressure may be about 120 MPa at maximum. As will be described later, the pressure of the fuel supplied to the injector 67 changes in accordance with the operating mode of the engine 1. The fuel supply system 62 is not limited to this structure.

As shown in FIG. 3, a spark plug 25 igniting an air-fuel mixture in the combustion chamber 19 is attached to the cylinder head 12. In this example, the spark plug 25 extends obliquely downward from the exhaust-side of the engine 1 and penetrates the cylinder head 12. As shown in FIG. 3, the tip of the spark plug 25 faces the inside of the cavity 141 of the piston 14 located in the compression top dead center.

As shown in FIG. 1, an intake passage 30 is connected to one side surface of the engine 1 to communicate with the intake port 16 of each cylinder 18. On the other hand, an exhaust passage 40, which exhausts the burnt gas (i.e., exhaust gas) from the combustion chamber 19 of each cylinder 18, is connected to the other side surface of the engine 1.

An air cleaner 31 filtering intake air is disposed at the upstream end of the intake passage 30. A surge tank 33 is disposed near the downstream end of the intake passage 30. The intake passage 30 is divided, downstream of the surge tank 33, into independent passages for the respective cylinders 18. The downstream end of each independent passage is connected to the intake port 16 of the associated one of the cylinders 18.

A water-cooling intercooler/warmer 34 cooling or heating the air, and a throttle valve 36 adjusting the amount of the air taken into each cylinder 18 are disposed in the intake passage 30 between the air cleaner 31 and the surge tank 33. The intake passage 30 is also connected to an intercooler bypass passage 35 bypassing the intercooler/warmer 34. This intercooler bypass passage 35 is provided with an intercooler bypass valve 351 for adjusting the flow rate of the air passing through the passage 35. The opening degree of the intercooler bypass valve 351 is adjusted to adjust the ratio of the flow rate of the intercooler bypass passage 35 to the flow rate of the intercooler/warmer 34, thereby adjusting the temperature of fresh air introduced into the cylinder 18. The intercooler/warmer 34 and its attachment may be omitted.

The upstream of the exhaust passage 40 is an exhaust manifold including the independent passages divided for the respective cylinders 18 and connected to the outside ends of the exhaust ports 17, and a collector collecting of the independent passages. A direct catalyst container 41 and an underfoot catalyst container 42 are provided as exhaust purifiers, which purify harmful components in the exhaust gas, downstream of the exhaust manifold in the exhaust passage 40. Each of the direct catalyst container 41 and the underfoot catalyst container 42 includes a tubular case, and, for example, a three-way catalyst in the passage inside the case. This engine 1 contains no $NO_x$ purification catalyst.

The portion of the intake passage 30 between the surge tank 33 and the throttle valve 36 is connected to the upstream of the direct catalyst container 41 in the exhaust passage 40 via an EGR passage 50 for recirculating part of the exhaust gas in the intake passage 30. This EGR passage 50 includes a main passage 51 provided with an EGR cooler 52 for cooling the exhaust gas with engine cooling water, and an EGR cooler bypass passage 53 for bypassing the EGR cooler 52. The main passage 51 is provided with an EGR valve 511 for adjusting the amount of the exhaust gas to be recirculated to the intake passage 30. The EGR cooler bypass passage 53 is provided with an EGR cooler bypass valve 531 for adjusting the flow rate of the exhaust gas circulating through the EGR cooler bypass passage 53.

Figure 4:
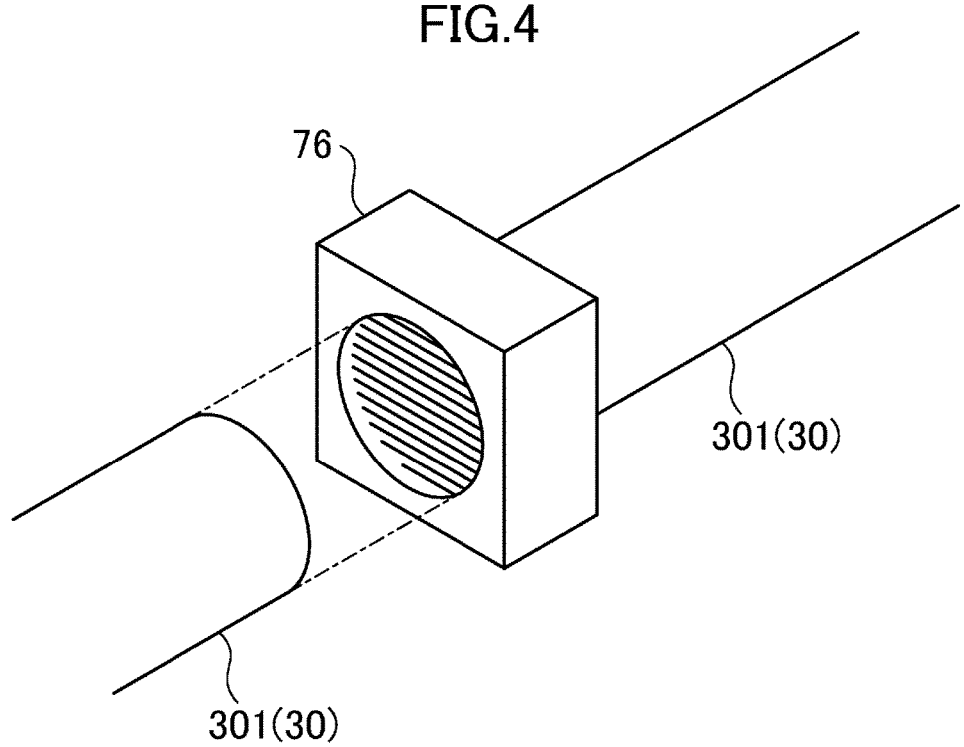
FIG. 4 is a schematic view illustrating the structure of an ozonator.

An ozonator (O3 generator) 76 is interposed between the throttle valve 36 and the surge tank 33 in the intake passage 30, and adds ozone to fresh air to be introduced to the cylinder 18. As shown in FIG. 4, for example, the ozonator 76 includes a plurality of electrodes horizontally or vertically arranged in parallel at predetermined intervals in the cross-section of an intake pipe 301. The ozonator 76 generates ozone by silent discharge using oxygen contained in intake air as a material gas. That is, a power supply (not shown) applies a high radiofrequency AC voltage to the electrodes to generate silent discharge in a discharge gap and ozonize air (i.e., intake air) passing through the discharge gap. The intake air with ozone added in this manner is introduced from the surge tank 33 via the intake manifold into each cylinder 18. By changing the type of voltage application to the electrodes of the ozonator 76 and/or the number of the electrodes applying a voltage, the ozone concentration in the intake air after having passed through the ozonator 76 is controlled. As will be described later, a PCM 10 controls the ozone concentration of the intake air to be introduced into the cylinder 18 by controlling the ozonator 76.

The engine 1 is controlled by a powertrain control module (hereinafter referred to as a PCM) 10. The PCM 10 is a microprocessor including a CPU, a memory, a counter timer group, an interface, and paths connecting these units. The PCM 10 is a controller.

As shown in FIGS. 1 and 2, detection signals of various sensors SW1-SW16 are input to the PCM 10. The various sensors include the following. An air flow sensor SW1 detects the flow rate of the fresh air downstream of the air cleaner 31. An intake temperature sensor SW2 detects the temperature of the fresh air. A second intake temperature sensor SW3 is disposed downstream of the intercooler/warmer 34, and detects the temperature of the fresh air after passing through the intercooler/warmer 34. An EGR gas temperature sensor SW4 is disposed near the portion of the EGR passage 50 connected to the intake passage 30, and detects the temperature of external EGR gas. An intake port temperature sensor SW5 is attached to the intake port 16, and detects the temperature of intake air immediately before flowing into the cylinder 18. A cylinder pressure sensor SW6 is attached to the cylinder head 12, and detects the pressure inside the cylinder 18. An exhaust temperature sensor SW7 and an exhaust pressure sensor SW8 are disposed near the portion of the exhaust passage 40 connected to the EGR passage 50, and detect the temperature and pressure of the exhaust gas, respectively. A linear $O_2$ sensor SW9 is disposed upstream of the direct catalyst container 41, and detects the concentration of oxygen in the exhaust gas. A lambda $O_2$ sensor SW10 is disposed between the direct catalyst container 41 and the underfoot catalyst container 42, and detects the concentration of oxygen in the exhaust gas. A water temperature sensor SW11 detects the temperature of the engine cooling water. A crank angle sensor SW12 detects the rotation angle of the crankshaft 15. An accelerator opening sensor SW13 detects the opening degree of the accelerator corresponding to the amount of operation of an accelerator pedal (not shown) of the vehicle. Intake-side and exhaust-side cam angle sensors SW14 and SW15 are provided. A fuel pressure sensor SW16 is attached to the common rail 64 of the fuel supply system 62, and detects the pressure of the fuel supplied to the injector 67.

The PCM 10 performs various types of calculation based on these detection signals to determine the states of the engine 1 and the vehicle. In accordance with the determination result, the PCM 10 outputs control signals to the actuators of the injector 67, the spark plug 25, the intake valve-side VVT 72 and VVT 74, the exhaust valve-side VVL 75 and VVL71, the fuel supply system 62, the various valves (e.g., the throttle valve 36, the intercooler bypass valve 351, the EGR valve 511, and the EGR cooler bypass valve 531), and the ozonator 76. As such, the PCM 10 operates the engine 1.

Figure 6:
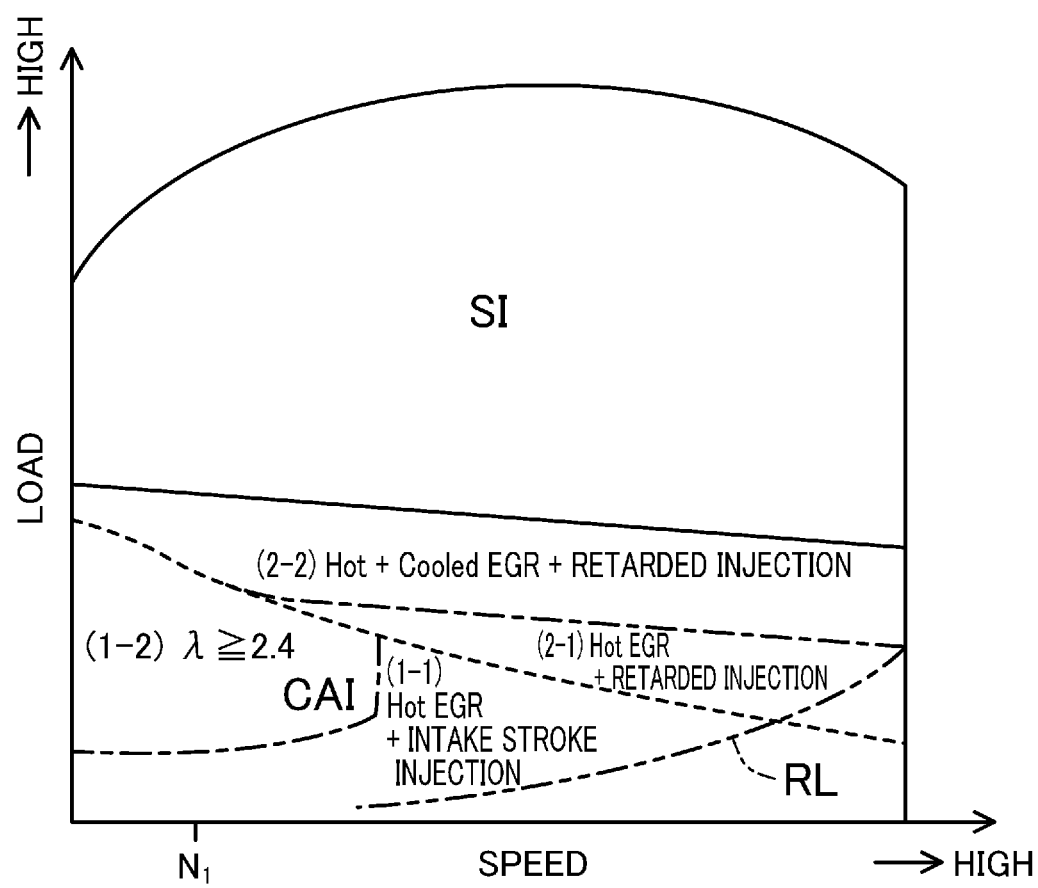
FIG. 6 is an example operation control map of an engine.

FIG. 6 illustrates an example operation control map of the engine 1. This engine 1 aims to improve the fuel efficiency and the exhaust emission. Within a relatively low load range of the engine, ignition with the spark plug 25 is not performed but compression ignition combustion is performed, which burns the fuel by compression auto-ignition (i.e., controlled auto-ignition combustion). In the example of FIG. 6, the range with a load lower than a combustion switching load, which is indicated by the solid line, corresponds to a compression ignition range for performing compression ignition.

Figure 5:
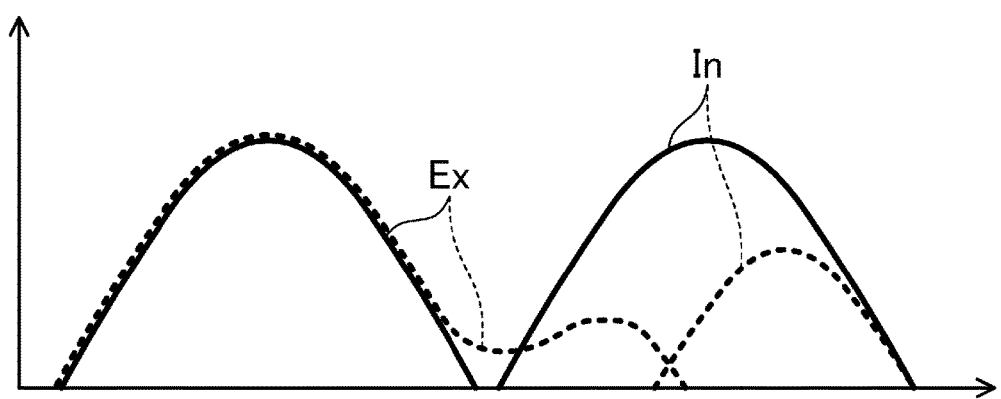
FIG. 5 illustrates example lift curves of intake and exhaust valves. The intake valve is switchable between a large-lift state and a small-lift state. The exhaust valve is switchable between a normal opening operation and a special operation, in which the exhaust valve is open again in an intake stroke.

However, with an increase in the engine load 1, the compression ignition combustion becomes rapid to cause problems such as combustion noise. Thus, within a relatively high load range of the engine, this engine 1 stops the compression ignition combustion, and starts the forced ignition combustion (spark ignition combustion here) with the spark plug 25. In the example of FIG. 5, the range with a load higher than or equal to the combustion switching load, which is indicated by the solid line, corresponds to a spark ignition range. As such, the engine 1 is switched between a controlled auto ignition (CAI) mode performing the compression ignition combustion, and a spark ignition (SI) mode performing the spark ignition combustion in accordance with the operating mode of the engine 1, particularly in accordance with the load of the engine 1. The boundary between the modes is not limited to what is shown in the figure.

The CAI mode is roughly divided into four ranges in accordance with the levels of the engine load and engine speed. Among the four ranges, combinations of the gas phase in the cylinder 18 and the type of fuel injection into the cylinder 18 are different. In the entire range of the CAI mode, the throttle valve 36 is fully open to maintain the maximum amount of air filling the cylinder 18. This reduces pump losses.

In the low and middle load ranges (1-1), (1-2), and (2-1) of the CAI mode, hot EGR gas of a relatively high temperature is introduced into the cylinder 18 to improve the ignitionability and the stability in the compression ignition combustion. This is because, although will be described later, the exhaust VVL 71 is turned on to perform the two-time opening for exhaust to open the exhaust valve 22 also in the intake stroke. The introduction of the hot EGR gas increases the compression end temperature in the cylinder 18, and is advantageous in improving the ignitionability and the stability in the compression ignition combustion in these ranges.

Figure 7A:
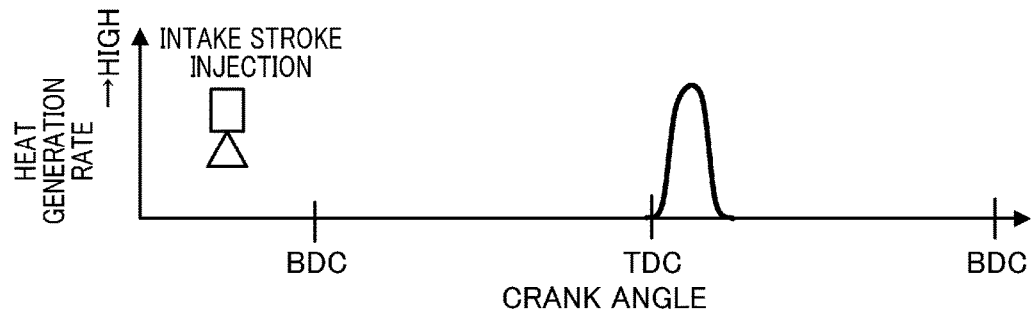
FIG. 7A illustrates an example time of fuel injection in performing intake stroke injection in a CAI mode, and a heat generation rate in CAI combustion according thereto.

Out of the ranges (1-1), (1-2), and (2-1), in which the hot EGR gas is introduced into the cylinder 18, in the ranges from (1-1) and (1-2), as shown in FIG. 7A, the injector 67 injects the fuel into the cylinder 18 at least in a period between the intake stroke and the first half of the compression stroke. As a result, a homogeneous air-fuel mixture is formed in the cylinder. The time of fuel injection is preferably set when the exhaust valve 22 is open again.

This is advantageous in vaporizing and spraying the fuel. As shown in FIG. 7A, the homogeneous air-fuel mixture is subject to the compression auto-ignition near the compression top dead center.

In the range (1-1), that is, in the range including the light load range of the lower speed range and the higher speed range, the excess air ratio $\lambda$ of the air-fuel mixture is lower than or equal to 1. The excess air ratio $\lambda$ is preferably substantially 1 ($\lambda \approx 1$). This ensures high exhaust emission utilizing a three-way catalyst.

On the other hand, in the range (1-2), that is, in the range higher than or equal to the predetermined load at the lower speed, the excess air ratio $\lambda$ of the air-fuel mixture is set higher than 1. The air-fuel mixture is preferably lean with an excess air ratio $\lambda$ higher than or equal to 2.4. This is advantageous in improving thermal efficiency and the fuel efficiency. Setting the excess air ratio $\lambda$ higher than or equal to 2.4 reduces generation of RawNOx, thereby securing high exhaust emission of the engine 1 without any NOx purification catalyst.

Figure 7B:
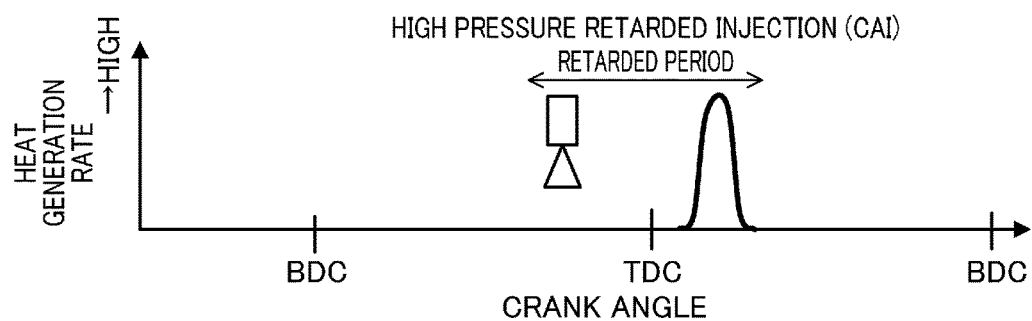
FIG. 7B illustrates an example time of fuel injection in performing high pressure retarded injection in the CAI mode, and a heat generation rate in the CAI combustion according thereto.

In the higher load and higher speed range (2-1) than the range (1-1), the state of temperature in the cylinder 18 is high. Thus, when the fuel is injected into the cylinder 18 within the period between the intake stroke and the middle of the compression stroke, abnormal combustion such as preignition occurs or pressure rise (dP/dt) in the cylinder 18 becomes rapid to cause combustion noise. On the other hand, if the compression start temperature and the compression end temperature are lowered without introducing hot EGR gas into the cylinder 18, the ignitionability in the compression ignition or the stability in the compression ignition combustion deteriorates. That is, in the range (2-1), the compression ignition combustion is not stably performed simply by controlling the temperature in the cylinder 18. Thus, in this range (2-1), creative fuel injection is used in addition to the control of the temperature in the cylinder 18 to reduce abnormal combustion such as preignition or combustion noise and stabilize the compression ignition combustion. Specifically, in this fuel injection, the fuel is injected into the cylinder 18 at a fuel pressure much higher than that of the conventional techniques at least within the period between the second half of the compression stroke and the initial stage of the expansion stroke (the period is hereinafter referred to as a "retarded period") as shown in FIG. 7B. This characteristic fuel injection is hereinafter referred to as "high pressure retarded injection" or simply "retarded injection." This high pressure retarded injection reduces abnormal combustion in the range (2-1) and stabilizes the compression ignition combustion in the expansion stroke. The details of the high pressure retarded injection will be described later. In the range (2-1), the excess air ratio $\lambda$ of the air-fuel mixture is 1 or lower, similarly to the range (1-1) (specifically, $\lambda \approx 1$). In the retard injection, since the time of fuel injection is late, the air-fuel mixture may be locally rich. Therefore, in order to ensure high exhaust emission, the excess air ratio $\lambda$ of the air-fuel mixture is set to substantially 1 and a three-way catalyst is utilized.

Figure 7C:
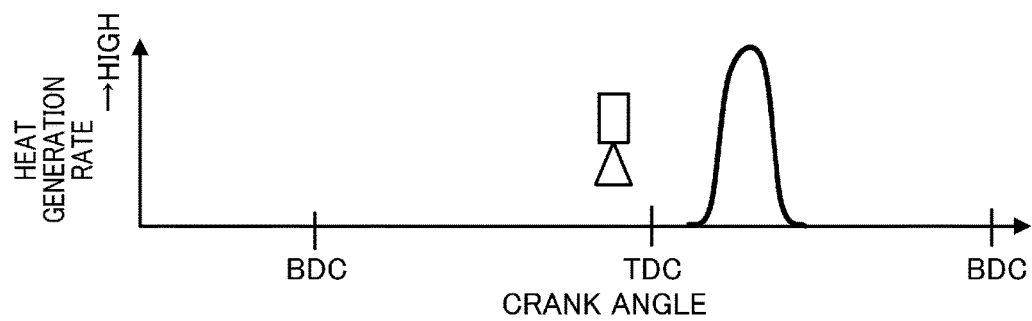
FIG. 7C illustrates an example time of fuel injection in performing high pressure retarded injection in a CAI mode in a higher load range, and a heat generation rate in the SI combustion according thereto.

In the high load range (2-2) of the CAI mode including the boundary between the CAI mode and the SI mode (i.e., the combustion switching load), the temperature in the cylinder 18 becomes higher. Thus, in order to suppress preignition, the amount of hot EGR gas is reduced, the EGR gas cooled while passing through the EGR cooler 52 is introduced into the cylinder 18. This reduces excessive rise in the compression end temperature. External EGR gas, which has passed through the EGR cooler 52, may be introduced into the cylinder 18. As shown in FIG. 7C, retard injection is performed in this range (2-2) as in the range (2-1). This allows for stable compression ignition combustion in the expansion stroke to reduce abnormal combustion and combustion noise. In this manner, this engine 1 expands the range of the CAI mode to the higher load range as much as possible.

Contrary to this CAI mode, although not shown in FIG. 6, the SI mode turns off the exhaust VVL 71 stops introduction of the hot EGR gas, and continues introduction of the cooled EGR gas. In the SI mode, although will be described later in detail, the throttle valve 36 is fully open as much as possible, and the opening degree of the EGR valve 511 is adjusted to adjust the amount of the fresh air, and the amount of the external EGR gas introduced to the cylinder 18. The adjustment of the ratio of the gas introduced into the cylinder 18 reduces pump losses. A large amount of the cooled EGR gas is introduced into the cylinder 18 to reduce abnormal combustion and to keep the combustion temperature of the spark ignition combustion low, thereby reducing generation of Raw NOx and cooling losses. In the full load range, the EGR valve 511 is closed to reduce the external EGR to zero.

As described above, the geometrical compression ratio of the engine 1 is set to 15 or higher (e.g., 18). The high compression ratio increases the compression end temperature and the compression end pressure, and is thus advantageous in stabilizing the compression ignition combustion particularly in the low load range (e.g., the ranges (1-1) and (1-2) of the CAI mode. On the other hand, the engine 1 with the high compression ratio is subject to abnormal combustion such as preignition and knocking in the SI mode of the high load.

Figure 7D:
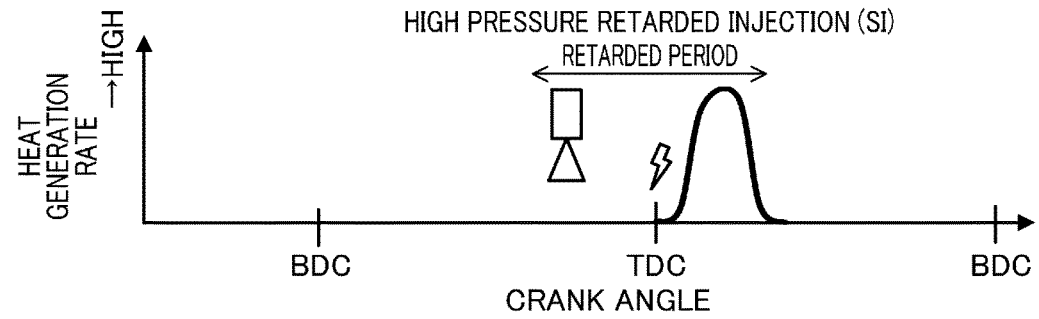
FIG. 7D illustrates an example time of fuel injection and an ignition time in performing high pressure retarded injection in an SI mode, and a heat generation rate in the SI combustion according thereto.

To address this problem, the engine 1 performs the above-described high pressure retarded injection in the SI mode to reduce abnormal combustion. More specifically, the engine 1 performs the high pressure retarded injection which injects the fuel into the cylinder 18 within the retarded period between the second half of the compression stroke and the initial stage of the expansion stroke at the high fuel pressure of 30 MPa or higher, as shown in FIG. 7D. After that, the engine 1 performs ignition near the compression top dead center. In the SI mode, in addition to the high pressure retarded injection within the retarded period, part of the fuel to be injected may be injected into the cylinder 18 within the intake stroke, in which the intake valve 21 is open (i.e., the divided injection is performed).

High pressure retarded injection in an SI mode will be briefly described. For example, as described in detail in Patent Document 2 (Japanese Unexamined Patent Publication No. 2012-172665), which is an Applicant's previous application, the high pressure retarded injection aims to shorten the reactive time between the start of the fuel injection and the end of the combustion, thereby reducing abnormal combustion. Specifically, the reactive time is the sum of the period when the injector 67 injects the fuel (i.e., (1) an injection period), the period until a burnable air-fuel mixture is formed around the spark plug 25 after the end of the injection (i.e., (2) an air-fuel mixture formation period), and the period until the combustion started by the ignition ends (i.e., (3) a combustion period), that is, (1)+(2)+(3). In the high pressure retarded injection, the fuel is injected at high pressure into the cylinder 18 to shorten the injection period and the mixture formation period. Shortening the injection period and the mixture formation period relatively retards the time of the fuel injection, more precisely, the start of the injection. In the high pressure retarded injection, the fuel is injected in the retarded period between the terminal stage of the compression stroke and the initial stage of the expansion stroke.

The fuel is injected into the cylinder 18 at the high fuel pressure, thereby increasing turbulence in the cylinder to increase the turbulence energy in the cylinder 18. This and relatively retarding the time of the fuel injection allow for performing spark ignition and start combustion, while maintaining the high turbulence energy. This shortens the combustion period.

As such, the high pressure retarded injection shortens all of the injection period, the mixture formation period, and the combustion period. As a result, the reactive time of the unburnt air-fuel mixture is largely shortened as compared to the conventional fuel injection in the intake stroke. As a result of shortening the reactive time, the reactivity of the unburnt air-fuel mixture is retarded at the end of the combustion, thereby reducing the abnormal combustion.

The combustion period is efficiently shortened by setting the fuel pressure to, for example, 30 MPa or higher. The fuel pressure of 30 MPa or higher effectively shortens both of the injection period and the mixture formation period. The fuel pressure is preferably set as appropriate in accordance with the characteristics of the fuel to be used, which contains at least gasoline. The upper limit may be, for example, 120 MPa.

The high pressure retarded injection employs creative injection of the fuel into the cylinder 18 to reduce abnormal combustion in the SI mode. Different from this injection, retarding the ignition time to reduce abnormal combustion is conventionally known. Retarding the ignition time reduces thermal efficiency and the torque. In performing the high pressure retarded injection, the creative fuel injection reduces abnormal combustion to advance the ignition time. This improves thermal efficiency and the torque. That is, the high pressure retarded injection not only reduces the abnormal combustion, but also advances the ignition time by the time corresponding to the reduction. This is advantageous in improving the fuel efficiency.

As described above, the high pressure retarded injection in the SI mode shortens all of the injection period, the mixture formation period, and the combustion period. The high pressure retarded injection in the ranges (2-1) and (2-1) of the CAI mode shortens the injection period, and the mixture formation period. Specifically, the fuel is injected into the cylinder 18 at the high fuel pressure, thereby increasing the turbulence in the cylinder to improve the mixing performance of the atomized fuel. As a result, a relatively homogeneous air-fuel mixture is formed rapidly even if the fuel is injected at a late time near the compression top dead center. The high pressure retarded injection in the CAI mode controls the start of reaction of the unburnt air-fuel mixture.

In the high pressure retarded injection in the CAI mode, the fuel is injected at a late time near the compression top dead center in the relatively high load range to reduce preignition, in the compression stroke in which no fuel is injected into the cylinder 18, and to rapidly form the roughly homogenous air-fuel mixture as described above. Thus, reliable compression ignition is possible after the compression top dead center. In the expansion stroke, in which motoring gradually reduces the pressure in the cylinder 18, the compression ignition combustion becomes slowly to reduce a rapid pressure rise (dP/dt) in the cylinder 18 according to the compression ignition combustion. This removes NVH constraints, resulting in expansion of the range of the CAI mode to the higher load. The high pressure retarded injection in the CAI mode controls the time of compression ignition combustion, and is thus advantageous in reducing abnormal combustion and combustion noise.

Now, features in the operation control map shown in FIG. 6 will be described further in detail. First, the ranges (1-2) and (2-1) are compared. In the CAI mode, the filling amount of the cylinder 18 is set to the maximum throughout the ranges. In the range (1-2), since the air-fuel mixture is lean with an excess air ratio $\lambda$ higher than 1, a larger amount of fresh gas is introduced into the cylinder 18, and a smaller amount of exhaust gas (internal EGR gas) is introduced into the cylinder 18. By contrast, in the range (2-1), since the excess air ratio $\lambda$ of the air-fuel mixture is 1 or lower (specifically, $\lambda \approx 1$). Thus, even with the same load, a relatively smaller amount of fresh air is introduced into the cylinder 18, and a relatively larger amount of exhaust gas (internal EGR gas) is introduced into the cylinder 18.

As described above, in the range (2-1), the load of the engine 1 is high, and accordingly, the state of temperature in the cylinder 18 is also high. Therefore, retard injection is employed and the excess air ratio λ of the air-fuel mixture is substantially 1 to reduce abnormal combustion and combustion noise.

By contrast, in the range (1-2), the engine 1 operates at a relatively lower speed than in the range (2-1). In this lower speed range (1-2), since a smaller amount of heat is generated per unit time, the state of temperature in the cylinder 18 is lower than in the range (2-1). Thus, abnormal combustion and combustion noise is reduced without employing retard injection. In the lower speed range (1-2) of the compression ignition range, the air-fuel mixture is lean with an excess air ratio λ higher than 1 as described above to improve the fuel efficiency. Such a range (1-2) may be provided at a lower speed of the half of the speed range of the engine 1.

In FIG. 6, in a lower-speed light-load range under the range (1-2) as well, making the air-fuel mixture lean with an excess air ratio λ higher than 1 to improve fuel efficiency is considered. However, in a range with a low load of the engine 1, since unburnt fuel increases, increasing the amount of EGR gas as much as possible to reduce unburnt fuel losses is more advantageous in improving fuel efficiency than making the air-fuel mixture lean with an excess air ratio higher than 1 to reduce the amount of EGR gas. Therefore, in the range under the range (1-2), the excess air ratio λ of the air-fuel mixture is preferably 1 or lower. In other words, the range (1-2) preferably has the predetermined or higher load.

On the other hand, with an increase in the load of the engine 1, the amount of injected fuel increases. It is thus difficult to make the excess air ratio λ of the air-fuel mixture 2.4 or higher. In the engine 1 without any NOx purification catalyst particularly, the range (1-2) preferably has a load lower than the predetermined load. In an engine with a NOx purification catalyst, the range (1-2), in which the air-fuel mixture is lean with an excess air ratio λ higher than 1 may expand toward a higher load than that shown in the figure.

The ranges (1-2) and (1-1) are compared at the same engine load (i.e., middle and high load in the CAI mode). In the lower speed range (1-2), the mixture is lean with an excess air ratio λ higher than 1, and the EGR ratio is reduced instead. In the higher speed range (1-1), the excess air ratio λ is 1 or lower and the EGR ratio is increased. In the higher speed range (1-1), a relatively large amount of the EGR gas is introduced into the cylinder 18 and the excess air ratio λ is 1 or lower to reduce NOx discharge and combustion noise.

In the range (1-2), in which the air-fuel mixture is lean with an excess air ratio λ higher than 1, the ozonator 76 may operate to add ozone to the intake air introduced into the cylinder 18 to ensure the ignitionability in the compression ignition and the stability in the compression ignition combustion. Introduction of ozone into the cylinder 18 improves the ignitionability of the air-fuel mixture and the stability in the compression ignition combustion. The maximum ozone concentration may fall, for example, within a range from about 50 ppm to about 30 ppm. In the range (1-2), since a large amount of fresh air is introduced into the cylinder 18, a large amount of ozone is introduced into the cylinder 18 even at a low ozone concentration. Setting a low ozone concentration minimizes power consumption needed for ozone generation, and is thus advantageous in improving fuel efficiency.

In the range (1-2), ozone may be particularly introduced when the outside air temperature is a predetermined or lower temperature. At a low outside air temperature, the compression start temperature in the cylinder 18 decreases, and accordingly the compression end temperature decreases. In particular, in the range (1-2), a large amount of fresh air is introduced into the cylinder 18 as described above, and a low outside air temperature more lowers the compression end temperature significantly. At an outside air temperature lower than or equal to the predetermined temperature, in the range (1-2), ozone may be introduced into the cylinder 18 to improve the ignitionability in the compression ignition and the stability in the compression ignition combustion.

In the operation control map shown in FIG. 6, in both of the ranges (1-2) and (2-1), hot EGR gas is introduced into the cylinder 18 so that the EGR ratio is higher than or equal to the predetermined value. However, the times of fuel injection are different between these ranges. Specifically, in the lower speed range (1-2), hot EGR gas is introduced into the cylinder 18 so that the EGR ratio is higher than or equal to the predetermined value, and fuel is injected into the cylinder 18 in the first half of the compression stroke or earlier. In the range (1-2), since the engine 1 operates at a relatively low speed to lower the state of temperature in the cylinder 18. This reduces abnormal combustion and combustion noise if the fuel is injected at a relatively early time. By contrast, in the higher speed range (2-1), the engine 1 operates at a relatively high speed to raise the state of temperature in the cylinder 18. Thus, fuel injection in a retarded time advantageously reducing abnormal combustion and combustion noise as described above.

The ranges (1-2) and (2-1) are compared to the range (2-2). In the range (1-2) and (2-1), only hot EGR gas is introduced into the cylinder 18. The range (2-2) is higher in load than in these ranges differs in that cooled EGR gas is introduced into the cylinder 18 in addition to the hot EGR gas. In the range (2-2) with the maximum load in the compression ignition range, the state of temperature in the cylinder 18 is high regardless of the speed level of the engine 1. As a result, this may cause rapid pressure rise (dP/dt) in the cylinder 18 in accordance with the compression ignition combustion. In order to address the problem, in the range (2-1), the cooled EGR gas is introduced into the cylinder 18 to reduce an excessive temperature rise in the cylinder at the start of compression, and eventually maintain the compression end temperature at a proper temperature. This is advantageous in reducing combustion noise in a higher load range (2-2) in the CAI mode and expands the CAI mode toward a higher load.

Both of the ranges (2-1) and (2-2) correspond to the ranges with a load higher than or equal to a road-load line RL indicated by the two-dot chain line in FIG. 6 at a higher speed in the compression ignition range. The times of fuel injection in the ranges (2-1) and (2-2) are both within a retarded period. The start of fuel injection is set, for example, at 30 to 40° C. before the compression top dead center. As shown in FIGS. 7B and 7C, although in the same retarded period, the time of fuel injection in the range (2-2) with a relatively high load is more retarded than the time of fuel injection in the range (2-1) with a relatively low load.

On the other hand, as described above, only the hot EGR gas is introduced into the cylinder 18 in the range (2-1), while both of the hot EGR gas and the cooled EGR gas are introduced into the cylinder 18 in the range (2-2) with a higher load than in the range (2-1). In this manner, in both of the ranges (2-1) and (2-2), the retard injection controls the start of reaction of an unburnt mixture, and controls the state of temperature in the cylinder 18 in accordance with the load level of the engine 1, thereby reducing both of abnormal combustion and combustion noise.

FIG. 8 illustrates, for example, changes in the EGR ratio according to the load level of the engine 1 (i.e., changes in the gas composition in the cylinder 18) where the speed is constant at $N_1$ (see FIG. 6). Now, the changes in the gas composition in the cylinder 18 will be sequentially described from the high-load range to the low-load range.

Between Load $T_{max}$ and Switching Load $T_3$

The higher load range than the switching load $T_3$ corresponds to the SI mode. As described above, in this SI range, only the cooled EGR gas is introduced into the cylinder 18. Specifically, the opening degree of the throttle valve 36 is maintained at the full-open. While being closed in the full load range, the EGR valve 511 is gradually opened in accordance with a decrease in the engine load. In the SI mode, the EGR ratio is set to the maximum under the condition where the air-fuel ratio of the mixture is the stoichiometric air-fuel ratio ($\lambda \approx 1$). This is advantageous in reducing pump losses. Setting the air-fuel ratio of the mixture to the stoichiometric air-fuel ratio enables utilization of a three-way catalyst. Since the amount of injected fuel decreases with a decrease in the engine load, the EGR ratio continuously increases. This continuously changes the gas composition in the cylinder 18 when the engine load continuously changes, and is thus advantageous in improving the controllability.

In spark ignition combustion, introduction of a too large amount of exhaust gas into the cylinder 18 degrades the combustion stability. Thus, there is the maximum the EGR ratio (i.e., EGR limit) settable in spark ignition combustion. As described above, with a decrease in the engine load, the EGR ratio continuously increases. At a predetermined load $T_4$, the EGR ratio reaches the EGR limit. Thus, at a lower load than the predetermined load $T_4$, the EGR ratio is restricted to the EGR limit. Therefore, between the predetermined load $T_4$ and the switching load $T_3$, the EGR ratio is constant at the EGR limit. In this manner, if the EGR ratio is restricted to the EGR limit, a smaller amount of fresh air is introduced into the cylinder 18 to set the air-fuel ratio of the mixture to be the stoichiometric air-fuel ratio ($\lambda \approx 1$). Retarding the closing time of the intake valve 21 to be at the intake bottom center or later reduces the amount of fresh air into the cylinder 18. Instead of controlling the closing time of the intake valve 21, for example, the opening degree of the throttle valve 36 may be controlled to reduce the fresh air introduced into the cylinder 18. Controlling the closing time of the intake valve 21 is advantageous in reducing pump losses.

Between Switching Load $T_3$ and Predetermined Load $T_2$

The switching load $T_3$ relates to the switching between the CAI mode and the SI mode. In the range with a load lower than or equal to the switching load $T_3$, the engine operates in the CAI mode. In each of the low and high load ranges from, which sandwich the switching load between the CAI mode and the SI mode, the air-fuel ratio of the mixture is set to the stoichiometric air-fuel ratio ($\lambda \approx 1$). Since the CAI mode is free from the restriction of the EGR ratio, the filling amount of the cylinder 18 is maximized without reducing the amount of fresh air introduced into the cylinder 18.

In the CAI mode, the exhaust VVL 71 is turned on to introduce internal EGR gas (i.e., hot EGR gas) into the cylinder 18. At the switching load $T_3$, the exhaust VVL 71 is switched on/off.

In the range (i.e., range (2-2)) next to the switching load $T_3$ at a lower load, a relatively large amount of the EGR gas (the cooled EGR gas) is introduced into the cylinder 18 continuously from the range next to the switching load $T_3$ at a higher load. At the same time, the high pressure retarded injection injecting the fuel at the fuel pressure of 30 MPa or higher near the compression top dead center to execute the compression ignition combustion.

Between Predetermined Load $T_2$ and Specified Load $T_1$

The range with a load lower than or equal to the predetermined load $T_2$ corresponds to the range (1-2) in FIG. 6. As described above, in this range, the excess air ratio $\lambda$ of the air-fuel mixture is higher than 1. Thus, in FIG. 8, the amount of fresh air introduced into the cylinder 18 is over the line of $\lambda \approx 1$, which is indicated by the dashed-dotted line, and the amount of exhaust gas (the amount of internal EGR gas here) is under the line of $\lambda \approx 1$. The period of gradually changing the excess air ratio $\lambda$ of the air-fuel mixture is provided between the switching load $T_3$ and the predetermined load $T_2$.

In the range with a load lower than or equal to the predetermined load $T_2$, with a decrease in the load of the engine 1, the amount of the hot EGR gas gradually increases, and the amount of fresh air gradually decreases. Increasing the amount of the introduced hot EGR gas increases the temperature in the cylinder at the start of compression, and accordingly increases the compression end temperature. This is advantageous in improving the ignitionability in the compression ignition and the stability of the compression ignition combustion in the range with a low load of the engine 1. The amount of the introduced hot EGR gas is adjusted by adjusting overlap between the opening times of the exhaust valve 22 and the intake valve 21 in the intake stroke. Specifically, adjusting the opening time of the intake valve 21 and the closing time of the exhaust valve 22 using the intake VVT 72 and the exhaust VVT 75, and switching the lift amount of the intake valve 21 between the large and small lifts using the intake VVL 74 are combined to adjust the amount of the introduced hot EGR gas.

Between Specified Load $T_1$ and Minimum Load

The EGR ratio, which continuously increases with a decrease in the load of the engine 1, is set to a maximum EGR ratio $r_{max}$ in the specified load $T_1$. To the specified load $T_1$, as described above, the EGR ratio is set continuously higher with a decrease in the load of the engine 1. When the load of the engine 1 is lower than the specified load $T_1$, the EGR ratio is fixed to the maximum EGR ratio $r_{max}$ regardless of the load level of the engine 1. The EGR ratio is set less than the maximum EGR ratio $r_{max}$. This is because, if the EGR ratio is increased to introduce a large amount of exhaust gas into the cylinder 18, the specific heat ratio of the gas in the cylinder 18 decreases. This rather lowers the compression end temperature even if the gas temperature is high before the start of compression.

Exhaust gas contains much of $CO_2$ and $H_2O$, which are triatomic molecules, and has a higher specific heat ratio than that of air containing nitrogen ($N_2$) and oxygen ($O_2$). Thus, when the EGR ratio is increased to introduce a larger amount of exhaust gas into the cylinder 18, the specific heat ratio of the gas in the cylinder 18 decreases.

Exhaust gas has a higher temperature than fresh air. With an increase in the EGR ratio, the temperature in the cylinder at the start of compression increases. However, the specific heat ratio of the gas decreases with an increase in the EGR ratio, the temperature of the gas does not increase so much even after the gas is compressed. As a result, the compression end temperature is the maximum at the predetermined EGR ratio $r_{max}$, and then lowers even if the EGR ratio increases.

In this engine 1, the compression end temperature is highest at the maximum EGR ratio $r_{max}$. When the load of the engine 1 is lower than the specified load $T_1$, the EGR ratio is set to the maximum EGR ratio $r_{max}$ to reduce a decrease in the compression end temperature. This maximum EGR ratio $r_{max}$ may be set within the range between 50% and 90%. The maximum EGR ratio $r_{max}$ may be set as high as possible as long as a high compression end temperature is obtained, and preferably be set within the range between 70% and 90%. Two-time opening of the exhaust valve is employed to introduce exhaust gas of the highest possible temperature into the cylinder 18. Specifically, two-time opening of the exhaust valve discharges exhaust gas to be introduced into the cylinder 18 to an exhaust port first. Unlike the configuration with the negative overlap period, in this two-time opening of the exhaust valve, exhaust gas is not compressed in the exhaust stroke or does not increase cooling losses. In addition, unlike the two-time opening of the intake valve, which discharges exhaust gas to an intake port of a relatively low temperature, this two-time opening of the exhaust valve, reduces the temperature drop of the exhaust gas. Therefore, the gas temperature at the start of compression is the maximum. If the engine 1 is configured to obtain the highest possible compression end temperature, the maximum EGR ratio $r_{max}$ may be set, for example, about 80%. Setting the maximum EGR ratio $r_{max}$ as high as possible is advantageous in reducing unburnt fuel loss of the engine 1. When the engine 1 has a low load, the unburnt fuel loss tends to increase. Setting the EGR ratio as high as possible when the load of the engine 1 is lower than the specified load $T_1$ is advantageous in improving the fuel efficiency due to the reduction in the unburnt fuel loss.

In this manner, in the engine 1, even when the load of the engine 1 is lower than the specified load $T_1$, the high compression end temperature is obtained to ensure the ignitionability in the compression ignition combustion and the combustion stability.

The technique disclosed herein is not only applicable to the above-described engine. For example, in the intake stroke, the fuel may be injected into the intake port 16 not via the injector 67 in the cylinder 18 but via an extra port injector in the intake port 16.

The engine 1 may contain a $NO_x$ purification catalyst.

The engine 1 is not limited to the straight 4-cylinder engine, but may be a straight 3-cylinder engine, a straight 2-cylinder engine, a straight 6-cylinder engine, etc. The engine 1 may also be various types of engines such as a V6-cylinder engine, a V8-cylinder engine, and a horizontally opposed four-cylinder engine.

The operation control map shown in FIG. 6 is the mere example, and other various maps may be provided.

The high pressure retarded injection may be divided as appropriate. Similarly, the intake stroke injection may be divided as appropriate. In these divided injections, the fuel may be injected in the intake stroke and in the compression stroke.

DESCRIPTION OF REFERENCE CHARACTERS

1 Engine (Engine Body)
10 PCM (Controller)
18 Cylinder
21 Intake Valve
22 Exhaust Valve
25 Spark Plug
50 EGR Passage (Gas state Adjustment System)
51 Main Passage (Gas state Adjustment System)
511 EGR Valve (Gas state Adjustment System)
52 EGR Cooler (Gas state Adjustment System)
67 Injector (Fuel Injection Valve)
71 (Exhaust) VVL (Gas state Adjustment System)
72 (Intake) VVT (Gas state Adjustment System)
74 (Intake) VVL (Gas state Adjustment System)
75 (Exhaust) VVT (Gas state Adjustment System)
76 Ozonator

The invention claimed is:

1. A control device for a compression ignition engine, comprising:
   an engine body including a cylinder;
   a fuel injection valve configured to inject fuel into the cylinder;
   a gas state adjustment system configured to adjust a ratio of an amount of fresh air introduced into the cylinder to an amount of exhaust gas to adjust a gas state of the cylinder; and
   a controller configured to operate the engine body by compression ignition combustion of an air-fuel mixture in the cylinder when the engine body operates in a predetermined compression ignition range, wherein
   when the engine body operates in a predetermined load range of the compression ignition range, which is higher than a predetermined load, the controller
      fully opens a throttle valve using the gas state adjustment system, and lowers an EGR ratio, which is a ratio of an amount of the exhaust gas to an entire amount of gas in the cylinder so that the air-fuel mixture in the cylinder is lean with an excess air ratio $\lambda$ higher than 1 in a lower speed range, in which an engine speed is lower than a predetermined speed, and
      fully opens the throttle valve, and increases the EGR ratio so that the air-fuel mixture in the cylinder has the excess air ratio $\lambda$ of 1 or lower in a higher speed range, in which the engine speed is higher than that in the lower speed range.

2. The control device of claim 1, further comprising:
   an ozonator configured to add ozone to the fresh air introduced into the cylinder, wherein
   the controller adds, in the lower speed range of the predetermined range, the ozone to the fresh air introduced into the cylinder using the ozonator.

3. The control device of claim 2, wherein
   the controller allows the ozonator to add the ozone to the fresh air introduced into the cylinder in the lower speed range of the predetermined range when an outside air temperature is lower than or equal to a predetermined temperature.

4. The control device of claim 1, wherein
   the fuel injection valve is configured to directly inject the fuel into the cylinder, and
   the controller
      sets a time of fuel injection with the fuel injection valve in a first half of a compression stroke or earlier in the lower speed range of the predetermined range, and
      sets the time of fuel injection with the fuel injection valve in a second half of the compression stroke or later in the higher speed range of the predetermined range.

5. The control device of claim 2, wherein
   the fuel injection valve is configured to directly inject the fuel into the cylinder, and
   the controller
      sets a time of fuel injection with the fuel injection valve in a first half of a compression stroke or earlier in the lower speed range of the predetermined range, and sets the time of fuel injection with the fuel injection valve in a second half of the compression stroke or later in the higher speed range of the predetermined range.

6. The control device of claim 3, wherein
the fuel injection valve is configured to directly inject the fuel into the cylinder, and
the controller
　sets a time of fuel injection with the fuel injection valve in a first half of a compression stroke or earlier in the lower speed range of the predetermined range, and
　sets the time of fuel injection with the fuel injection valve in a second half of the compression stroke or later in the higher speed range of the predetermined range.

* * * * *